United States Patent
Xiong et al.

(10) Patent No.: US 11,071,170 B2
(45) Date of Patent: Jul. 20, 2021

(54) REG BUNDLING SIZE AND DM-RS PATTERN FOR PHYSICAL DOWNLINK CONTROL CHANNEL

(71) Applicant: Apple Inc., Cupertino, CA (US)

(72) Inventors: Gang Xiong, Portland, OR (US); Hong He, Sunnyvale, CA (US); Debdeep Chatterjee, San Jose, CA (US); Honglei Miao, Munich (DE); Yongjun Kwak, Portland, OR (US)

(73) Assignee: APPLE INC., Cupertino, CA (US)

( * ) Notice: Subject to any disclaimer, the term of this patent is extended or adjusted under 35 U.S.C. 154(b) by 14 days.

(21) Appl. No.: 16/467,185

(22) PCT Filed: Apr. 2, 2018

(86) PCT No.: PCT/US2018/025753
§ 371 (c)(1),
(2) Date: Jun. 6, 2019

(87) PCT Pub. No.: WO2018/187242
PCT Pub. Date: Oct. 11, 2018

(65) Prior Publication Data
US 2020/0092946 A1 Mar. 19, 2020

Related U.S. Application Data

(60) Provisional application No. 62/588,107, filed on Nov. 17, 2017, provisional application No. 62/482,084, filed on Apr. 5, 2017.

(51) Int. Cl.
H04L 5/00 (2006.01)
H04L 1/00 (2006.01)
(Continued)

(52) U.S. Cl.
CPC ......... H04W 88/023 (2013.01); H04L 1/0047 (2013.01); H04L 1/0071 (2013.01);
(Continued)

(58) Field of Classification Search
None
See application file for complete search history.

(56) References Cited

U.S. PATENT DOCUMENTS

2013/0058240 A1* 3/2013 Kim ............... H04L 5/0007
370/252
2013/0089048 A1* 4/2013 Damnjanovic ....... H04L 5/0023
370/329
(Continued)

OTHER PUBLICATIONS

3GPP TSG RAN WG1 #89; R1-1707379; CORESETs for PDCCH; Agenda Item: 7.1.3.1.2; Intel Corporation; May 15-19, 2017; Hangzhou, China.

*Primary Examiner* — Ajit Patel

(57) ABSTRACT

Technology for a user equipment, operable to configure a control resource set (CORESET) is disclosed. The UE can decode a signal, received from a next generation node B (gNB), that includes a resource element group (REG) bundling size for a first CORESET. The UE can decode a signal, received from the gNB that includes a REG bundling size for a second CORESET. The UE can decode a control message contained in one or more REGs in one or more of the first CORESET or the second CORESET.

20 Claims, 10 Drawing Sheets

(51) Int. Cl.
  *H04W 88/02* (2009.01)
  *H04W 76/27* (2018.01)
  *H04L 5/10* (2006.01)
  *H04W 80/08* (2009.01)

(52) U.S. Cl.
  CPC .......... *H04L 5/0007* (2013.01); *H04L 5/0051* (2013.01); *H04L 5/10* (2013.01); *H04W 76/27* (2018.02); *H04W 80/08* (2013.01)

(56) References Cited

U.S. PATENT DOCUMENTS

| | | |
|---|---|---|
| 2013/0235812 A1 | 9/2013 | Heo et al. |
| 2013/0242882 A1 | 9/2013 | Blankenship et al. |
| 2013/0294547 A1* | 11/2013 | Lane .................... H04L 1/0036 375/340 |
| 2013/0301549 A1 | 11/2013 | Chen et al. |
| 2014/0071918 A1* | 3/2014 | Park ..................... H04L 5/0053 370/329 |
| 2014/0071935 A1* | 3/2014 | Papasakellariou .. H04W 72/042 370/330 |
| 2014/0128085 A1* | 5/2014 | Charbit .................... H04L 5/00 455/450 |
| 2014/0341146 A1* | 11/2014 | Nakashima ......... H04W 72/042 370/329 |
| 2016/0242161 A1* | 8/2016 | Webb .................... H04L 1/0072 |
| 2016/0242203 A1* | 8/2016 | You ..................... H04L 27/2602 |
| 2016/0302180 A1* | 10/2016 | Nory ..................... H04L 5/0096 |
| 2016/0345117 A1* | 11/2016 | Nguyen ............... H04W 72/048 |
| 2017/0318563 A1* | 11/2017 | Yang .................... H04L 5/0053 |
| 2018/0035411 A1* | 2/2018 | Wang .................... H04L 1/0045 |
| 2018/0375636 A1* | 12/2018 | You ....................... H04L 5/0053 |
| 2020/0305129 A1* | 9/2020 | Lee .................... H04W 72/0446 |
| 2020/0389870 A1* | 12/2020 | Shin .................... H04W 72/042 |

\* cited by examiner

REG BUNDLING SIZE AND DM-RS PATTERN FOR PHYSICAL DOWNLINK CONTROL CHANNEL

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
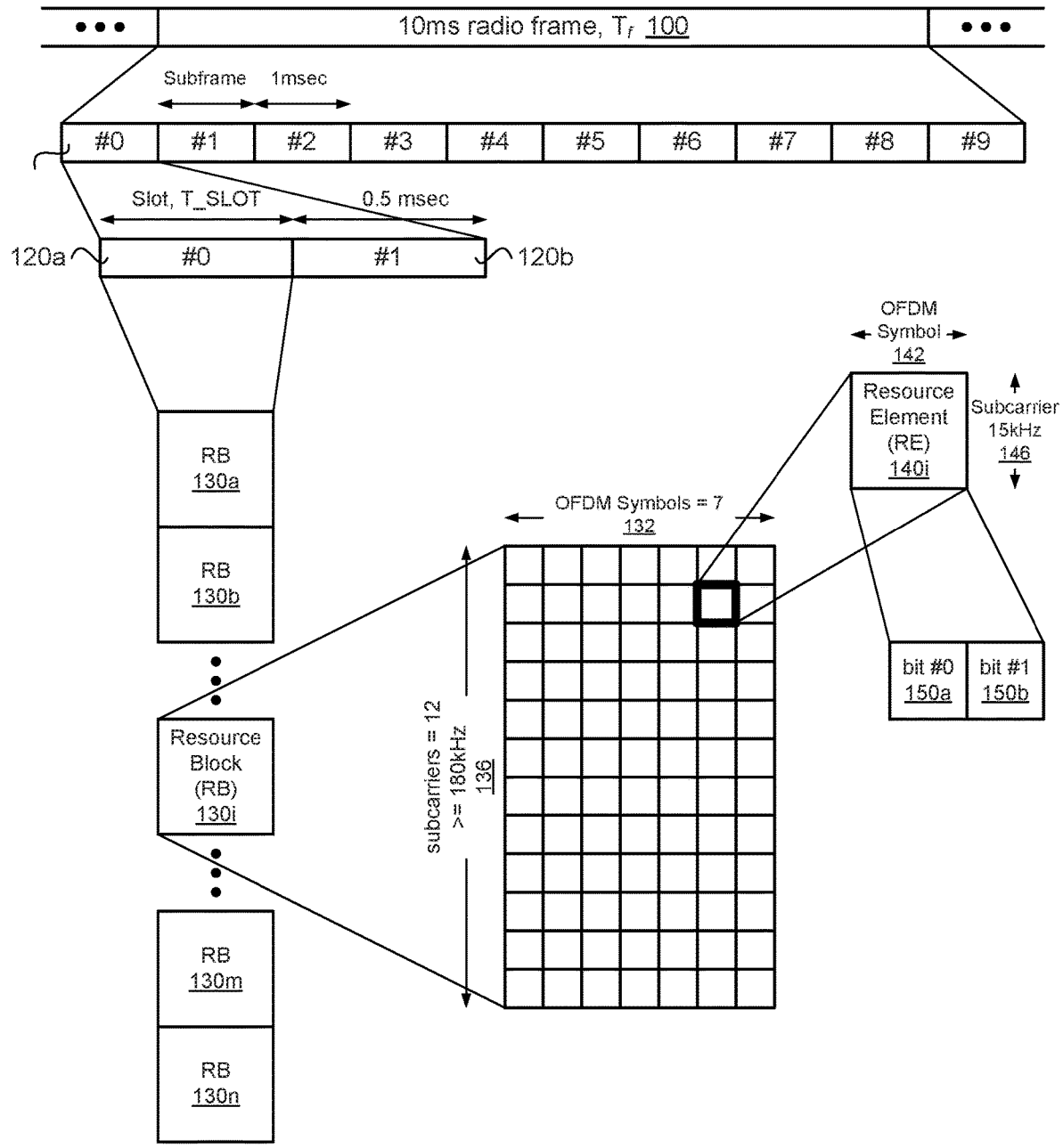
FIG. 1A illustrates a block diagram of an orthogonal frequency division multiple access (OFDMA) frame structure, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communications has evolved significantly from early voice systems to today's highly sophisticated integrated communication platforms. The next generation wireless communication system, 5 G, or new radio (NR), will provide access to information and sharing of data anywhere, and anytime by various users and applications. NR is expected to be a unified network/system that is targeted to meet vastly different and sometime conflicting performance dimensions and services. Such diverse multi-dimensional constraints are driven by different services and applications. In general, NR will evolve based on 3GPP LTE-Advanced Releases 10-14, with additional potential new Radio Access Technologies (RATs) to enrich peoples' lives with better, simple and seamless wireless connectivity solutions. NR will enable substantially everything to be connected by wireless and deliver fast, rich contents and services.

As defined in NR, a control resource set (CORESET) hereafter is a set of resource element groups (REG) within which the UE attempts to blindly decode downlink control information (DCI). Further, the CORESET is defined as a set of REGs under a given numerology. The REGs may or may not be frequency contiguous. When the control resource set spans multiple orthogonal frequency demodulation multiplexing (OFDM) symbols, a control channel candidate is mapped to multiple OFDM symbols or to a single OFDM symbol. The gNB can inform the UE which control channel candidates are mapped to each subset of OFDM symbols in the control resource set.

Further, multiple CORESETS, can be configured for a UE. In order to support the transmission of the common channel, typically comprising common DCI, paging, and system information blocks (SIBs), there can be one common CORESET configured for a UE or a group of UEs. In addition, it is also possible to configure a UE-specific CORESET for the transmission of UE-specific data channels. It is also possible that a UE-specific data channel can be transmitted using a common CORESET.

FIG. 1A provides an example of a 3GPP LTE Release 8 frame structure. In particular, FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$ of 0.5 ms. The first slot (#0) 120$a$ can include a legacy physical downlink control channel (PDCCH) 160 and/or a physical downlink shared channel (PDSCH) 166, and the second slot (#1) 120*b* can include data transmitted using the PDSCH.

Each slot for a component carrier (CC) used by the node and the wireless device can include multiple resource blocks (RBs) 130*a*, 130*b*, 130*i*, 130*m*, and 130*n* based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first Orthogonal Frequency Division Multiplexing (OFDM) symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130*i* can include 12-15 kilohertz (kHz) subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140*i* using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP LTE Release 8 frame structure provides examples of the way in which data is transmitted, or the transmission mode. The example is not intended to be limiting. Many of the Release 8 features will evolve and change in 5 G frame structures included in 3GPP LTE Release 15 and beyond. In such a system, the design constraint is on co-existence with multiple 5 G numerologies in the same carrier due to the coexistence of different network services, such as eMBB (enhanced Mobile Broadband) 204, mMTC (massive Machine Type Communications or massive IoT) 202 and URLLC (Ultra Reliable Low Latency Communications or Critical Communications) 206. The carrier in a 5 G system can be above or below 6 GHz. In one embodiment, each network service can have a different numerology.

Figure 1B:
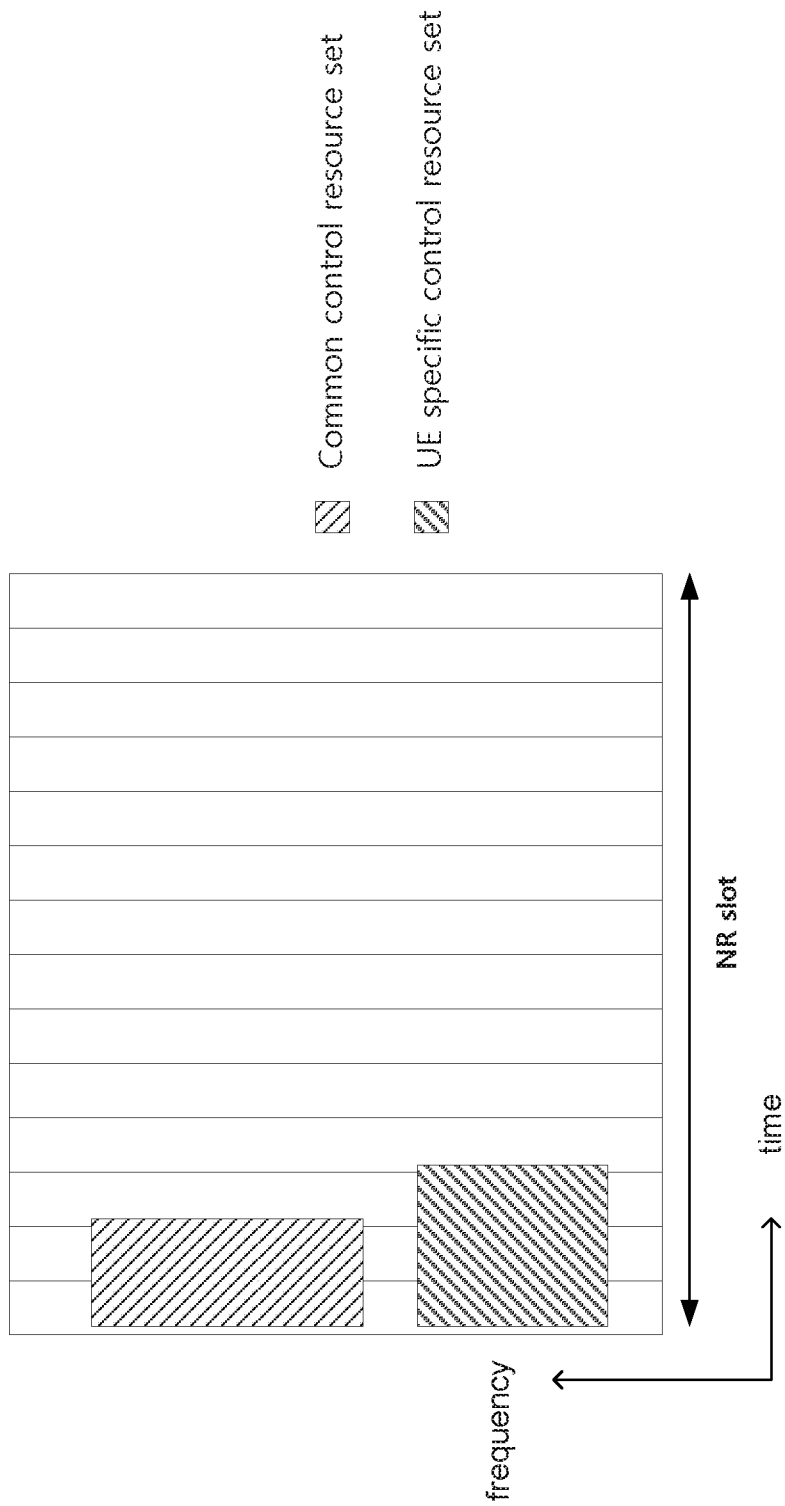
FIG. 1B illustrates multiple control resource sets (CORESETS) for a given user equipment (UE), in accordance with an example.

FIG. 1B illustrates multiple control resource sets (CORESETS) for a given user equipment (UE). FIG. 1B further displays an example of a resource allocation for a common CORESET and UE-specific CORESET in a slot from a UE perspective.

In one embodiment, a physical downlink control channel (PDCCH) transmitted on multiple REGs can use the same precoder. This REG bundling can help improve channel estimation performance by interpolating the channel estimation across multiple REGs. In general, relatively large aggregation level (AL), e.g., AL 4 and 8, as defined in 3GPP LTE Release 8, can be employed for the scheduling of a common control message using a common CORESET in order to provide robust decoding performance. In this embodiment, relatively large REG bundling size is desirable to further improve channel estimation performance. This can be extremely important for the scheduling of a common control message, which is mainly targeted for a low signal to noise ratio (SNR) regime where channel estimation performance is typically a bottleneck.

REG Bundling Size

As mentioned above, in one embodiment of the invention, an independent REG bundling size can be configured for common search space (CSS) and UE specific search space (USS). In particular, a REG bundling size for CSS can be K0 while the REG bundling size for USS can be K1, and K0 can be greater than or equal to (>=) K1. In one example, K0=4 or 6, while K1=2 or 3. It can be noted that REG bundling can be applied for a time or a frequency domain or a combination thereof.

Alternatively, an independent REG bundling size can be configured for a UE group (i.e. common) CORESET and a UE specific CORESET.

Demodulation Reference Signal Pattern

For NR, a one-port transmit diversity scheme with REG bundling per control channel element (CCE) is employed for new radio physical downlink control channel (NR-PDCCH). Also, to improve control channel capacity for NR-PDCCH, multiple user—Multiple Input Multiple Output (MU-MIMO) can be applied for the transmission of NR PDCCH. However, it is not desirable to apply MU-MIMO for the common search space (CSS). MU-MIMO for CSS is mainly used to schedule the transmission of common control messages, including system information or random-access response (RAR) messages, and targeted for cell-edge users.

Figure 2B:
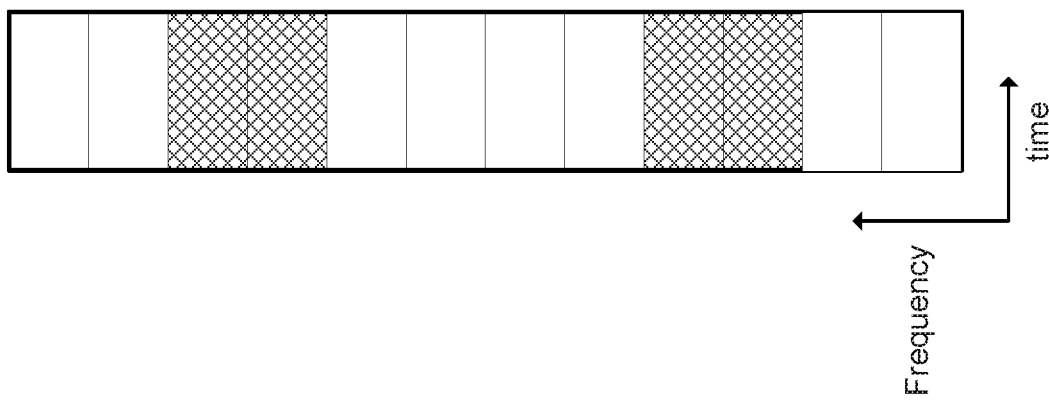
FIG. 2B illustrates a DM-RS pattern for two antenna ports (AP), where orthogonal cover code (OCC) is used, in accordance with an example.
Figure 2A:
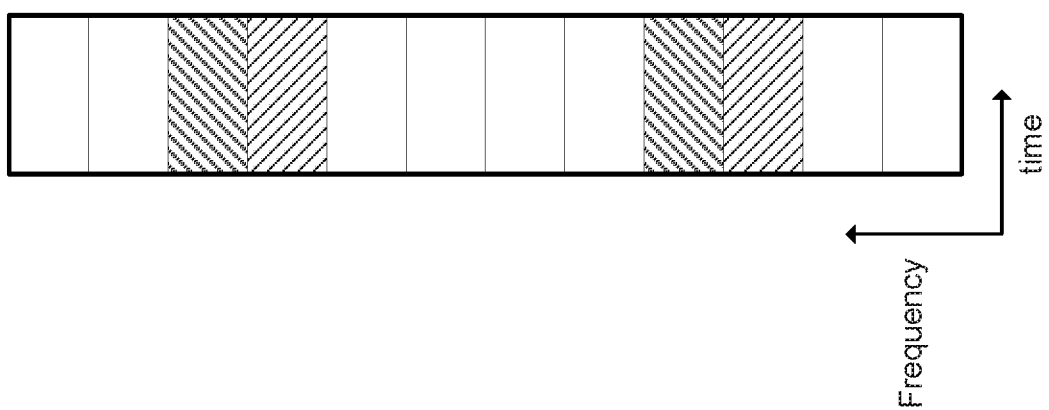
FIG. 2A illustrates demodulation reference signals (DM-RS) pattern for two antenna ports (AP); in accordance with an example.

FIG. 2A illustrates a demodulation reference signals (DM-RS) pattern for two antenna ports (AP). Additionally, FIG. 2 illustrates one example of a DM-RS pattern in the case where 2 APs are used within one REG In the design, 4 resource elements (REs) can be utilized for the transmission of DMRS, wherein there can be 2 REs per each antenna port. Further, frequency division multiplexing (FDM) or code division multiplexing (CDM) based multiplexing of DM-RS for 2 APs can be used as shown in the figure. In this example, an orthogonal cover code (OCC) is used to provide CDM. Other types of CDM can also be used.

FIG. 2B illustrates a DM-RS pattern for two antenna ports (AP), where OCC is used. In one embodiment, to reduce the DM-RS overhead, 2 REs may be allocated within one REG for CSS as mentioned above. In this case, more resources can be used for the transmission of the control channel, which can further help to improve the decoding performance for the control channel.

Figure 3:
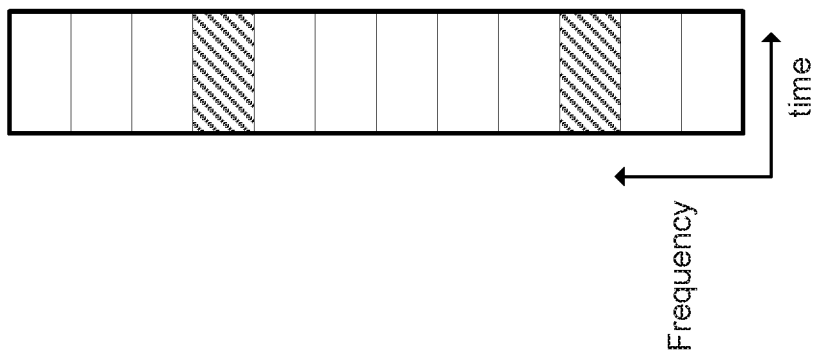
FIG. 3 illustrates demodulation reference signals (DM-RS) patterns for one antenna ports (AP), in accordance with an example.
Figure 3:
Figure 3:

FIG. 3 illustrates demodulation reference signals (DM-RS) patterns for one antenna ports (AP), which can be used for the transmission of PDCCH in CSS. Even with the same number of antenna ports (APs), the DM-RS density may be different for channel estimation enhancements depending on DM-RS pattern, e.g., 4 REs per REG vs 6 REs per REG.

In one embodiment of the invention, independent DM-RS patterns can be configured for the CSS and UE specific search space (USS). Alternatively, independent DM-RS patterns can be configured for a (UE group) or common CORESET and UE specific CORESET.

In one embodiment, in the case when DM-RS pattern or REG bundling size is separately configured for CSS and USS or common CORESET and UE specific CORESET, a certain mechanism can be defined to ensure alignment between the gNB and the UE for proper demodulation and decoding for the downlink (DL) control channel.

In one example, NR system information can be transmitted to the NR UE using three different channels; NR Physical Broadcast Channel (PBCH) for the transmission of a part of a minimum predetermined amount of system information. This is referred to as the Master Information Block (MIB) or minimum system information (MSI). A second set of system information can be sent on a channel referred to as the NR PDSCH, which can be used for the transmission of the remaining minimum system information (RMSI). A third channel, referred to as the NR PDSCH, can be used for transmission of the other system information (OSI).

In NR, various embodiments of system information blocks (SIB) and master information blocks (MIB) or minimum system information (MSI) or remaining minimum system information (RMSI) can be utilized to be broadcasted via eNB or UE in new radio or LTE systems. System Information Blocks are grouped in system information (SI) containers. Each SI is composed of multiple SIBs. Each SI usually will have different transmission frequency and will be sent in a single sub-frame. SIBs are transmitted using a broadcast control channel (BCCH) mapped on a downlink shared channel (DL-SCH) which in turn mapped on PDSCH.

In one embodiment of the invention, a configuration of DM-RS patterns or REG bundling sizes for CSS, UE group or common CORESET for the scheduling of remaining minimum system information (RMSI), can be predefined in the specification or indicated in master information block (MIB) or minimum system information (MSI).

In another embodiment of the invention, configurations of DM-RS patterns or REG bundling sizes for CSS, UE group or common CORESET can be predefined in the specification or indicated in the MIB, the MSI, the RMSI, or the other system information (OSI).

In another embodiment of the invention, configurations of DM-RS patterns or REG bundling sizes for CSS or UE specific CORESET can be predefined in the specification or indicated in the MIB, MSI, RMSI, OSI or that is configured by radio resource control (RRC) signaling. During the initial access or 4 process random access (RACH) procedure prior to RRC configuration, the UE may use the configuration of the DM-RS pattern or REG bundling size based on a predefined configuration or the configuration indicated in the MIB, the MSI, the RMSI, or the OSI.

In another embodiment, for RRC reconfiguration, the DM-RS pattern or REG bundling size for CSS or UE specific CORESET can be updated accordingly. Within a timing gap, e.g., N slots after the RRC reconfiguration is transmitted via a NR physical downlink shared channel (PDSCH) or after a physical uplink control channel (PUCCH) carrying an ACK feedback for a corresponding PDSCH carrying RRC reconfiguration, the UE may still use old configurations for DM-RS patterns or REG bundling sizes.

Alternatively, the UE may use the configuration of DM-RS patterns or REG bundling sizes based on predefined configurations or the configurations indicated in the MSI or the MIB or the RMSI, or the OSI. After N slots, when RRC reconfiguration is sent, the UE can use the new configuration for the DM-RS patterns or REG bundling sizes which is configured in the RRC reconfiguration. Note that the timing gap, or N slots, can be predefined in the specification or configured by higher layers via MSI, RMSI, OSI or RRC signaling.

Methods for Interleaving Matrix and REG Bundle Size Configurations for RMSI CORESET Additionally, according to the latest 3GPP new radio development, for each control channel resource set (CORESET), precoder granularity in the frequency domain can be configurable between two options: 1) the precoder granularity can be equal to the resource element group (REG bundle size in the frequency domain; or 2) the precoder granularity can be equal to the number of contiguous resource blocks (RBs) in the frequency domain within the CORESET.

In the case of option 2, the DMRS can be mapped over all resource element groups (REGs) within the CORESET. It is further assumed that the CORESET for physical downlink control channel (PDCCH) scheduling remaining minimum system information (RMSI) can be configured with Option 1.

Moreover, it is also agreed that the physical broadcast channel (PBCH) contents, except the synchronization signal block (SSB) index, can be the same for all synchronization signal (SS)/PBCH blocks within an SSB burst set for the same center frequency. The maximum number of bits for configuration of an RMSI CORESET(s) and RMSI timing in a PBCH is X bits excluding the subcarrier spacing. RMSI CORESET(s), as used herein, refers to the CORESET(s) configured by the PBCH for monitoring the PDCCH that is used to schedule the RMSI. Configuration of the RMSI CORESET(s) can consider at least the following properties: 1) bandwidth (PRBs); 2) frequency position (frequency offset relative to SS/PBCH block); and 3) a set of consecutive orthogonal frequency division multiplexing (OFDM) symbol indices in a slot corresponding to a single CORESET.

Due to the coverage constraint, it is plausible that PDCCH scheduling the RMSI can be transmitted in a frequency distributed manner by virtue of interleaved control channel element (CCE) to REG mapping. In NR 3GPP Rel. 15, the UE specific PDCCH interleaver can be realized by a rectangular interleaving matrix, by which the interleaving unit is written row-by-row in increasing column order and read out column-by-column in increasing row order. The number of rows for the interleaving matrix can be configurable.

The following processes are disclosed for interleaving configuration for the configuration of CORESET for scheduling of RMSI.

Process 1: Separate REG Bundle and Interleaving Configuration

In this process, several RMSI CORESET configurations can be defined. Besides the bandwidth, frequency location and CORESET duration, i.e., 1-3 OFDM symbols, each RMSI CORESET configuration can also explicitly or implicitly indicate the used REG bundle size and number of rows of the interleaving matrix. As a result, the nth, n=1 . . . , N, RMSI CORESET configuration can include one or more of the following information: bandwidth, frequency location or resource block assignment index; CORESET time duration, e.g., x, OFDM symbols; REG bundle size, e.g., x or 6; Number of rows in an interleaving matrix; configurable ID for cyclic shift of the interleaving unit; indication whether wideband RS is present for RMSI CORESET; Other timing monitoring information; Monitoring window duration; Monitoring window periodicity or slot pattern; and monitoring window offset.

In one embodiment, a bitmap may be used with each PDCCH candidate, to be monitored per each aggregation level. Additionally, the transmission scheme can be configured to be localized or distributed mapping.

In one embodiment, in the PBCH, the RMSI CORESET configuration field can signal the index used for the RMSI CORESET. After the UE correctly receives the PBCH, the interleaving method can be known to the UE.

In another embodiment, the UE may be configured with a resource index parameter indicating a combinatorial index r corresponding to the frequency location (i.e. the PRB index $\{k_i\}$, $i \in (0, N_{RB}^{RMSI}-1)$, $1 \leq k_i \leq N_{RB}^{Ref}$) and the number of PRBs constituting the RMSI CORESET denoted as $N_{RB}^{RMSI}$. In some designs, $$r = \sum_{i=0}^{N_{RD}^{RMSI}-1} \binom{N_{RB}^{Ref} - k_i}{N_{RB}^{RMSI} - i}$$

wherein $N_{RB}^{Ref}$ is the number of PRB pairs associated with the reference DL bandwidth indicated by PBCH.

$$\binom{x}{y} = \begin{cases} \binom{x}{y} & x \geq y \\ 0 & x < y \end{cases}$$

is the extended binomial coefficient, resulting in a unique label $$r \in \left\{0, \ldots, \binom{N_{RB}^{Ref}}{N_{RB}^{RMSI}} - 1\right\}.$$

In another embodiment, the identification used for cyclic shift of the interleaving unit for the CORESET for PDCCH scheduling RMSI may be predefined in the specification or equal to cell ID.

Process 2: Interleaver Configuration with Fixed REG Bundle Size

In this process, the REG bundle size can be configured to be fixed. For example, the REG bundle size can be defined the same as the CORESET time duration for 2- or 3-symbol CORESETs and equal to either 2 or 3 REGs for a 1-symbol CORESET, or alternatively fixed to 6.

As another alternative, REG bundling size can be fixed to 6 for 2- and 3-symbol CORESETs, and to either of 2 or 3 REGs for CORESETs with a duration of 1 symbol. Therefore, in contrast to Process 1, REG bundle size is not an RMSI CORESET configuration parameter described in the specification.

Process 3: Fixed REG Bundle Size and Interleaver Configuration

To further reduce the number of RMSI CORESET configurations and resulted signaling, both fixed REG bundle sizes and the number of rows of the interleaving matrix can be specified. Additionally, the RMSI CORESET can be configured where there aren't any REG bundle sizes and number of rows of interleaving matrix defined in each RMSI CORESET configuration. As such, the following matrix configurations are proposed.

In the Alt-1 configuration, the REG bundle size is equal to the CORESET time duration. Additionally, the number of rows of the interleaving matrix can be represented by 6/REG bundle size. Accordingly, the Alt-1 configuration maximizes the frequency diversity of each CCE.

In the Alt-2 configuration, the REG bundle size is equal to the CORESET time duration. Additionally, the number of rows of the interleaving matrix can be represented by 4*6/REG bundle size. The Alt-2 maximizes the frequency diversity of aggregation level AL-4 PDCCH candidates comprised of 4 consecutive CCEs.

In the Alt-3 configuration, the REG bundle size is equal to the CORESET time duration. Additionally, the number of rows of the interleaving matrix can be represented by 8*6/REG bundle size. Alt-3 maximizes the frequency diversity of AL-8 PDCCH candidates comprised of 8 consecutive CCEs.

In the Alt-4 configuration, the REG bundle size is equal to 6. Additionally, the number of rows of the interleaving matrix is equal to 4. Alt-4 maximizes the frequency diversity of AL-4 PDCCH candidates comprised of 4 consecutive CCEs.

In the Alt-4 configuration, the REG bundle size is equal to 8. Additionally, the number of rows of the interleaving matrix is equal to 8. Alt-5 maximizes the frequency diversity of AL-8 PDCCH candidates comprised of 8 consecutive CCEs.

In another alternative for the interleaver matrix for interleaved PDCCH for COREST for RMSI scheduling, the number of rows is fixed at 6. In another example, for 2 or 3-symbol CORESETs, the number of rows is defined as 6, while for 1 symbol CORESET, the number of rows is 6/(REG bundle size). Note that various additional combinations of REG bundle sizes and rows of interleaving matrices from the above are also possible, and not limited to the combinations presented here.

In another embodiment of the invention, for the CORESET configuration for PDCCH for random access, one or more of the following parameters may be configured by RMSI: bandwidth; frequency location; CORESET time duration, e.g., x, OFDM symbols; REG bundle size, e.g., x or 6; number of rows in interleaving matrix; and configurable ID for cyclic shift of the interleaving unit.

In another option, one or more of the above described parameters can use the same value which is configured to for the RMSI CORESETs or determined using one or more ways described above for CORESET for RMSI scheduling.

In another embodiment, the UE can be configured with at least one CORESET configuration at least for PDCCH and for random access. Further, if not configured by RMSI, the CORESET configuration(s) for random access is/are the one(s) configured by the PBCH. In the time domain, monitoring the periodicity of the CORESETs for PDCCH and for random access may be separately configured from that for RMSI, which can be configured by RMSI. Further, the same or different monitoring periodicity of CORESETs for PDCCH for scheduling of Random Access Procedure Msg. 2, 3, and/or 4 can be configured.

Figure 4:
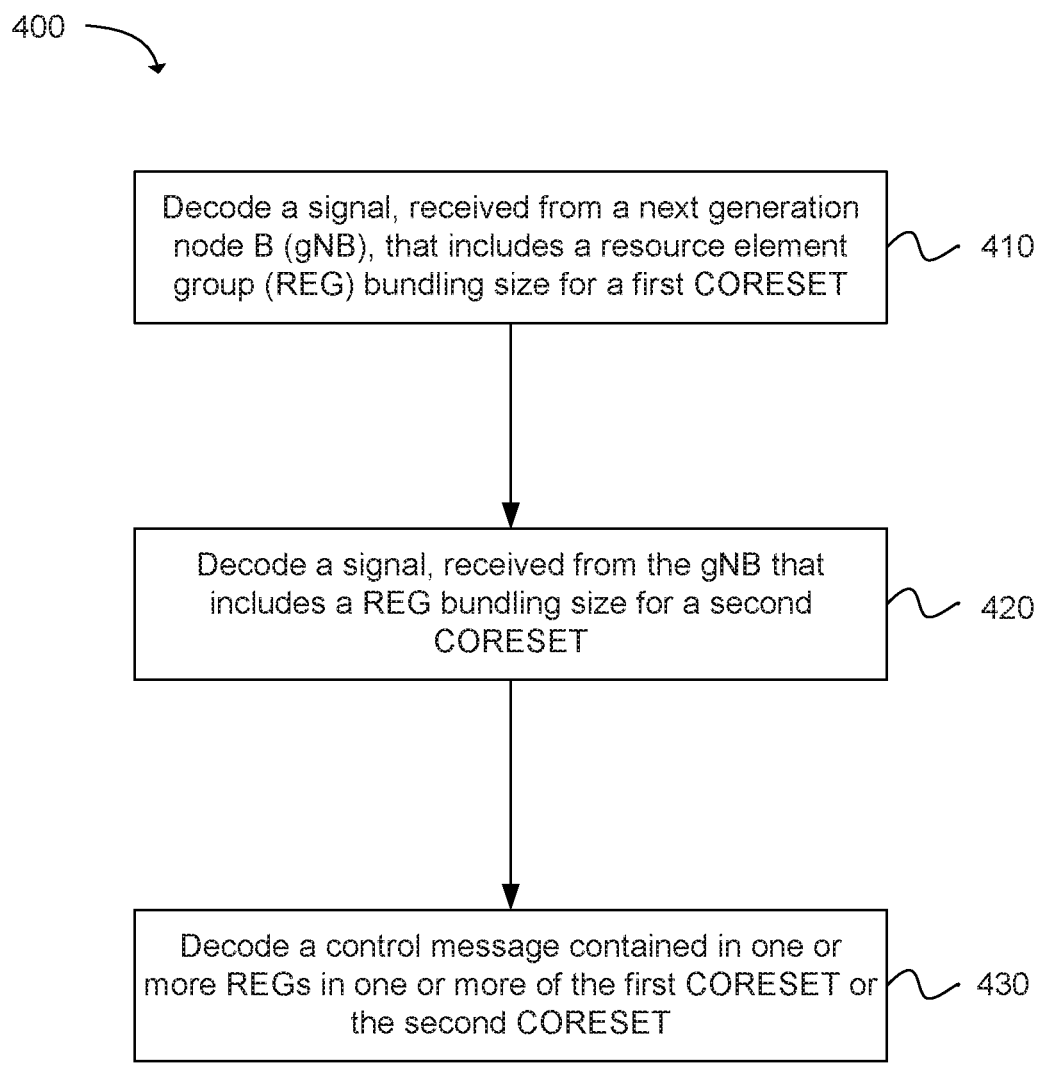
FIG. 4 depicts functionality of a user equipment (UE), operable to configure a control resource set (CORESET), in accordance with an example.

FIG. 4 depicts functionality 400 of a user equipment (UE), operable to configure a control resource set (CORESET). The UE can comprise of one or more processors configured to decode a signal, received from a next generation node B (gNB) that includes a resource element group (REG) bundling size for a first CORESET 410. The UE can comprise of one or more processors configured to decode a signal, received from the gNB that includes a REG bundling size for a second CORESET 420. The UE can comprise of one or more processors configured to decode a control message contained in one or more REGs in one or more of the first CORESET or the second CORESET 430.

In one embodiment, the one or more processors are further configured to determine the REG bundling size for the first CORESET, wherein the first CORESET includes control channel elements (CCE) that are mapped to one or more resource elements in the REGs using interleaving.

In one embodiment, the one or more processors are further configured to determine the REG bundling size for the second CORESET, wherein the second CORESET includes control channel elements (CCE) that are mapped to one or more resource elements in the REGs using interleaving.

In one embodiment, the UE further comprises a transceiver, wherein the transceiver is configured to receive the REG bundling size for the first CORESET and the REG bundling size for the second CORESET via higher layer signaling.

In one embodiment, the first CORESET is one of a common CORESET, or a UE-specific CORESET.

In one embodiment, the second CORESET is one of a common CORESET, or a UE-specific CORESET.

In one embodiment, the UE includes an antenna, a touch sensitive display screen, a speaker, a microphone, a graphics processor, an application processor, an internal memory, a non-volatile memory port, or combinations thereof.

Figure 5:
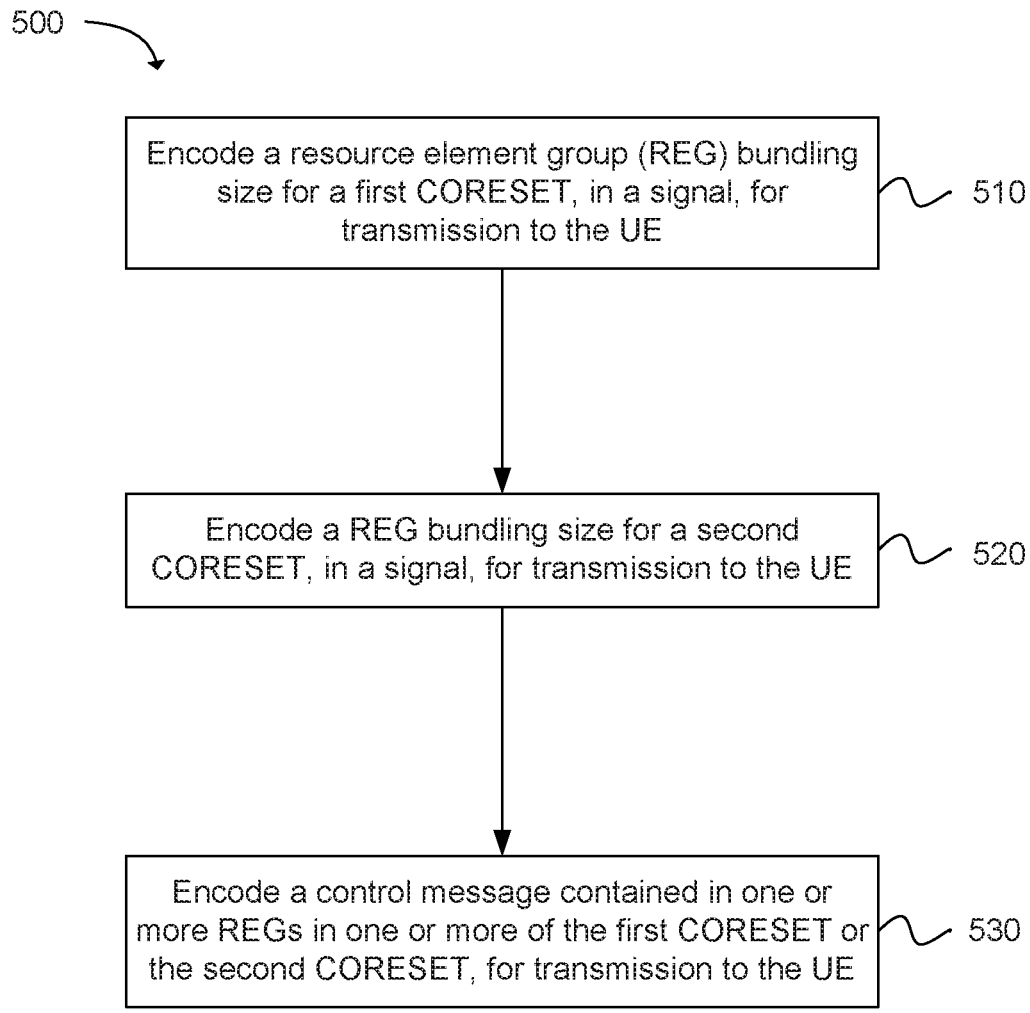
FIG. 5 depicts functionality of a serving cell, operable to configure a control resource set (CORESET) for a user equipment (UE), in accordance with an example.

FIG. 5 depicts functionality 500 of a serving cell, operable to configure a control resource set (CORESET) for a user equipment (UE). The serving cell can comprise of one or more processors configured to encode a resource element group (REG) bundling size for a first CORESET, in a signal, for transmission to the UE 510. The serving cell can comprise of one or more processors configured to encode a REG bundling size for a second CORESET, in a signal, for transmission to the UE 520. The serving cell can comprise of one or more processors configured to encode a control message contained in one or more REGs in one or more of the first CORESET or the second CORESET, for transmission to the UE 530.

In one embodiment, the one or more processors are further configured to encode the REG bundling size for the first CORESET for transmission to the UE, wherein the first CORESET includes control channel elements (CCE) that are mapped to one or more resource elements in the REGs using interleaving.

In one embodiment, the serving cell further comprises a transceiver, wherein the transceiver is configured to transmit the REG bundling size for the first CORESET and the REG bundling size for the second CORESET to the UE via higher layer signaling.

In one embodiment, the higher layer signaling is radio resource control (RRC) signaling.

In one embodiment, the first CORESET is one of a common CORESET, or a UE-specific CORESET.

In one embodiment, the second CORESET is one of a common CORESET, or a UE-specific CORESET.

Figure 6:
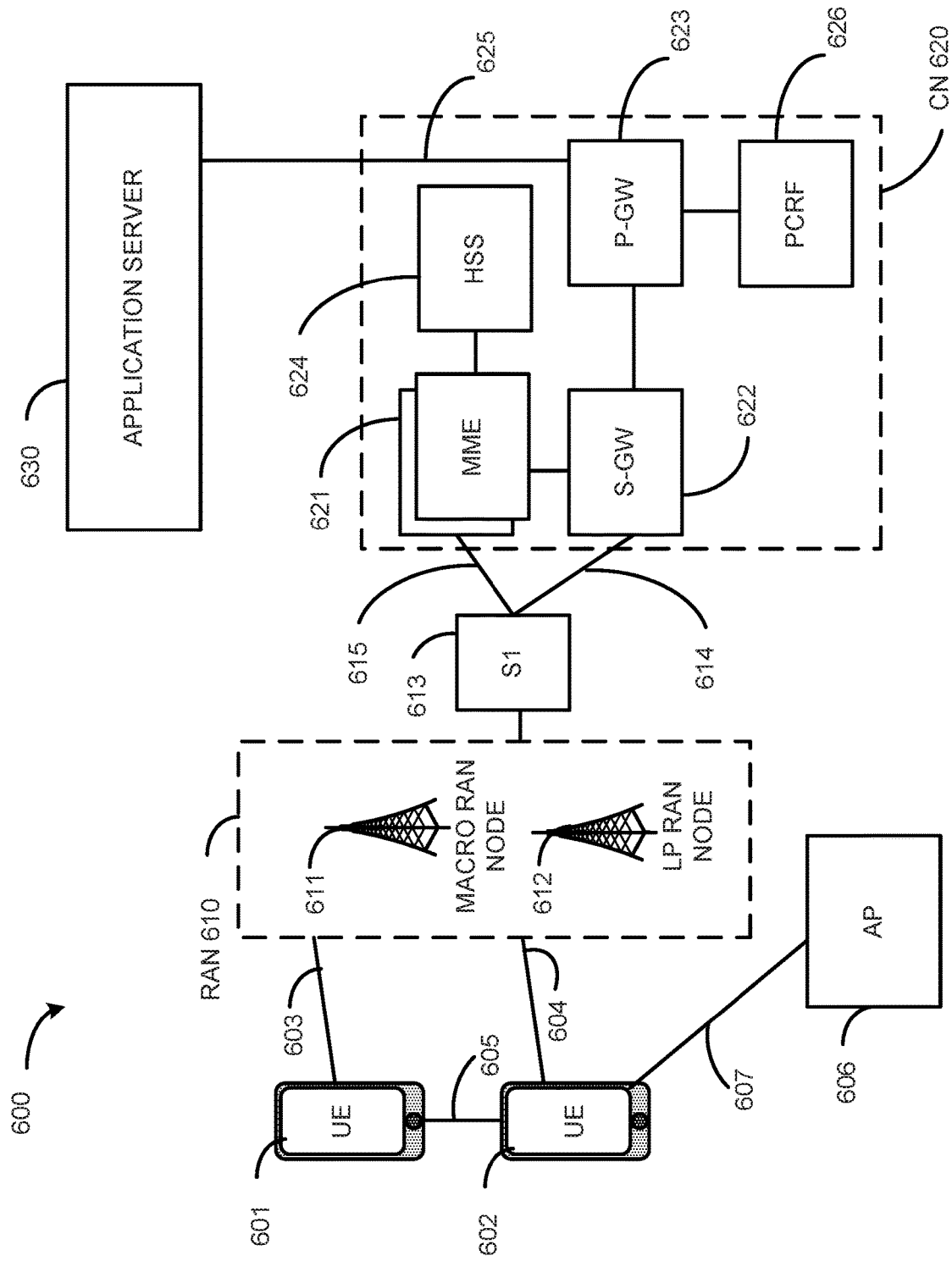
FIG. 6 illustrates an architecture of a network in accordance with an example.

FIG. 6 illustrates architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a Ne8 Gen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), ne8 Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8 ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a Ne8Gen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and e8 ernal networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
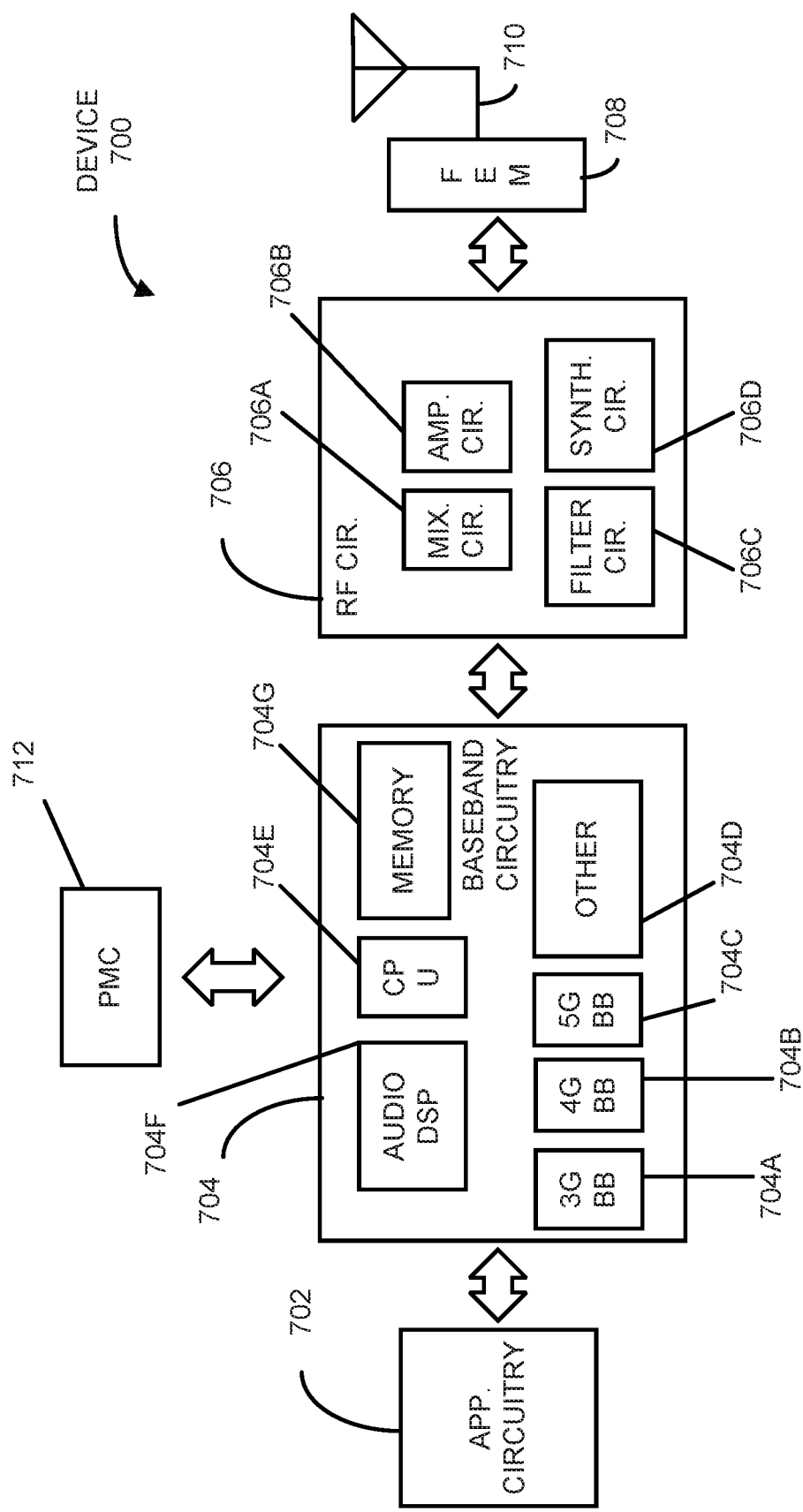
FIG. 7 illustrates a diagram of a wireless device (e.g., UE) and a base station (e.g., eNodeB) in accordance with an example.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706*a*, amplifier circuitry 706*b* and filter circuitry 706*c*. In some embodiments, the transmit signal path of the RF circuitry 706 may include filter circuitry 706*c* and mixer circuitry 706*a*. RF circuitry 706 may also include synthesizer circuitry 706*d* for synthesizing a frequency for use by the mixer circuitry 706*a* of the receive signal path and the transmit signal path. In some embodiments, the mixer circuitry 706*a* of the receive signal path may be configured to down-convert RF signals received from the FEM circuitry 708 based on the synthesized frequency provided by synthesizer circuitry 706*d*. The amplifier circuitry 706*b* may be configured to amplify the down-converted signals and the filter circuitry 706*c* may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a necessity. In some embodiments, mixer circuitry 706*a* of the receive signal path may comprise passive mixers, although the scope of the embodiments is not limited in this respect.

In some embodiments, the mixer circuitry 706*a* of the transmit signal path may be configured to up-convert input baseband signals based on the synthesized frequency provided by the synthesizer circuitry 706*d* to generate RF output signals for the FEM circuitry 708. The baseband signals may be provided by the baseband circuitry 704 and may be filtered by filter circuitry 706*c*.

In some embodiments, the mixer circuitry 706*a* of the receive signal path and the mixer circuitry 706*a* of the transmit signal path may include two or more mixers and may be arranged for quadrature downconversion and upconversion, respectively. In some embodiments, the mixer circuitry 706*a* of the receive signal path and the mixer circuitry 706*a* of the transmit signal path may include two or more mixers and may be arranged for image rejection (e.g., Hartley image rejection). In some embodiments, the mixer circuitry 706*a* of the receive signal path and the mixer circuitry 706*a* may be arranged for direct downconversion and direct upconversion, respectively. In some embodiments, the mixer circuitry 706*a* of the receive signal path and the mixer circuitry 706*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706*d* may be a fractional-N synthesizer or a fractional N/N+1 synthesizer, although the scope of the embodiments is not limited in this respect as other types of frequency synthesizers may be suitable. For example, synthesizer circuitry 706*d* may be a delta-sigma synthesizer, a frequency multiplier, or a synthesizer comprising a phase-locked loop with a frequency divider.

The synthesizer circuitry 706*d* may be configured to synthesize an output frequency for use by the mixer circuitry 706*a* of the RF circuitry 706 based on a frequency input and a divider control input. In some embodiments, the synthesizer circuitry 706*d* may be a fractional N/N+1 synthesizer.

In some embodiments, frequency input may be provided by a voltage controlled oscillator (VCO), although that is not a necessity. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 802, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
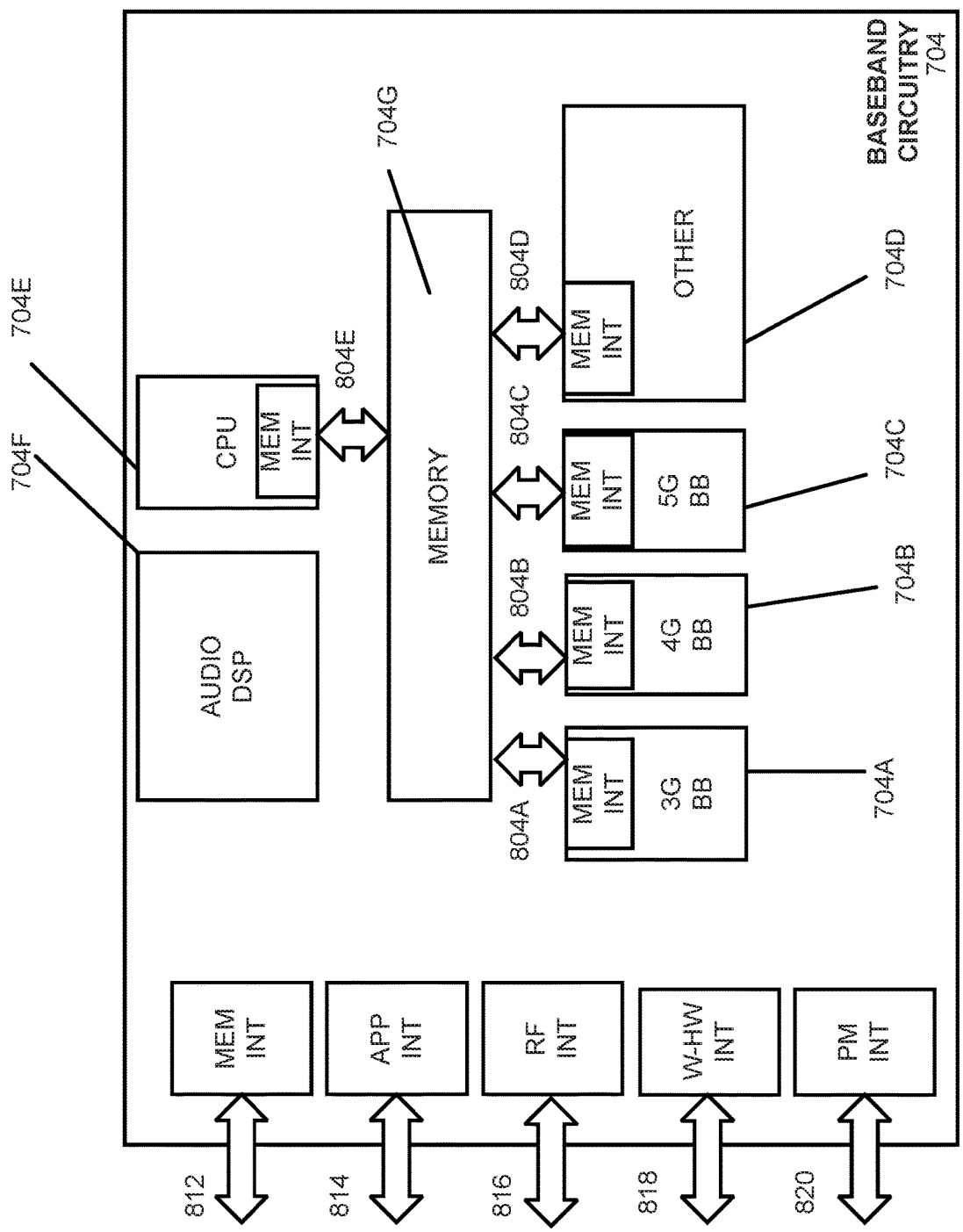
FIG. 8 illustrates example interfaces of baseband circuitry in accordance with an example.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
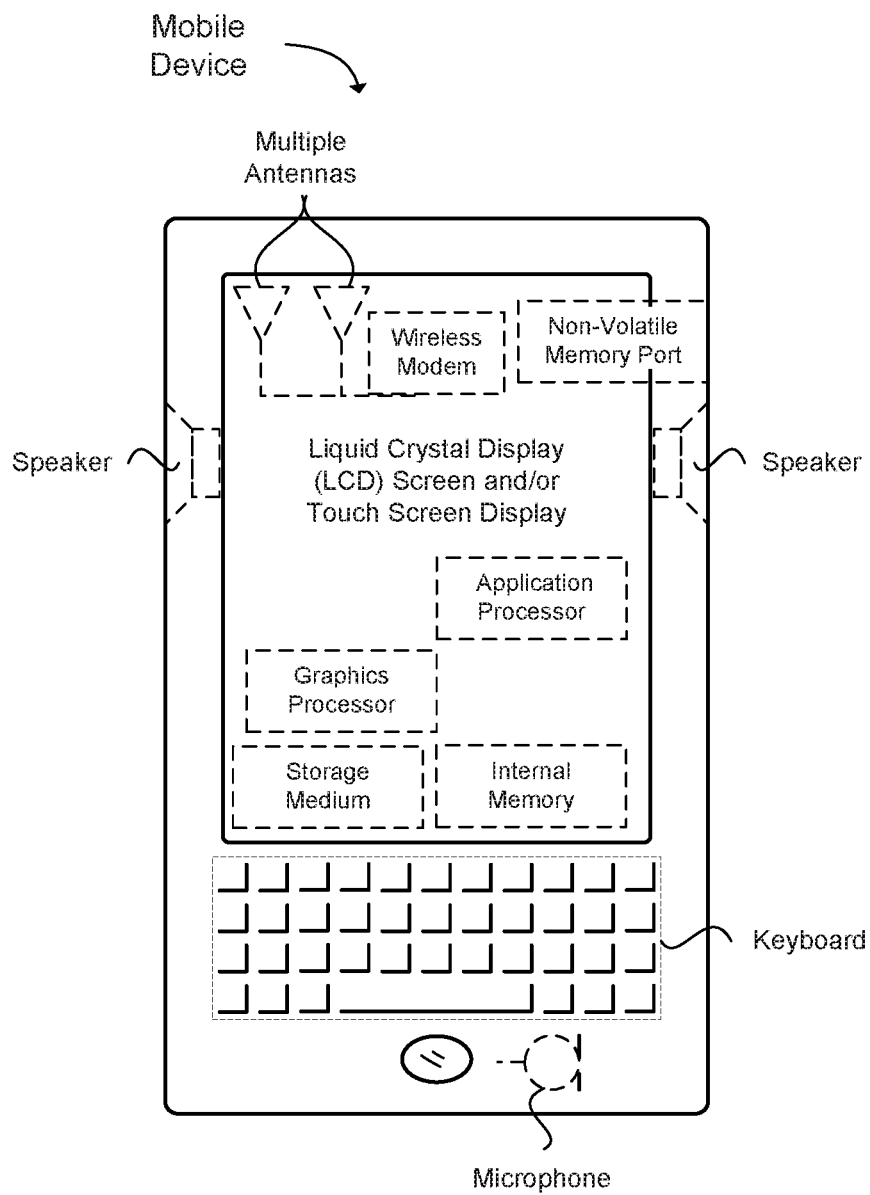
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE), operable to configure a control resource set (CORESET), the apparatus comprising: one or more processors configured to: decode a signal, received from a next generation node B (gNB), that includes a resource element group (REG) bundling size for a first CORESET; decode a signal, received from the gNB that includes a REG bundling size for a second CORESET; and decode a control message contained in one or more REGs in one or more of the first CORESET or the second CORESET; a memory interface configured to send to a memory the REG bundling size for the first CORESET and the REG bundling size for the second CORESET.

Example 2 includes the apparatus of example 1, wherein the one or more processors are further configured to determine the REG bundling size for the first CORESET, wherein the first CORESET includes control channel elements (CCE) that are mapped to one or more resource elements in the REGs using interleaving.

Example 3 includes the apparatus of example 1, wherein the one or more processors are further configured to determine the REG bundling size for the second CORESET, wherein the second CORESET includes control channel elements (CCE) that are mapped to one or more resource elements in the REGs using interleaving.

Example 4 includes the apparatus of example 1, further comprising a transceiver, wherein the transceiver is configured to receive the REG bundling size for the first CORESET and the REG bundling size for the second CORESET via higher layer signaling.

Example 5 includes the apparatus of example 1, wherein the first CORESET is one of a common CORESET, or a UE-specific CORESET.

Example 6 includes the apparatus of example 1, wherein the second CORESET is one of a common CORESET, or a UE-specific CORESET.

Example 7 includes the apparatus of example 1 to 6, wherein the UE includes an antenna, a touch sensitive display screen, a speaker, a microphone, a graphics processor, an application processor, an internal memory, a non-volatile memory port, or combinations thereof.

Example 8 includes an apparatus of a serving cell, operable to configure a control resource set (CORESET) for a user equipment (UE), the apparatus comprising: one or more processors configured to: encode a resource element group (REG) bundling size for a first CORESET, in a signal, for transmission to the UE; encode a REG bundling size for a second CORESET, in a signal, for transmission to the UE; and encode a control message contained in one or more REGs in one or more of the first CORESET or the second CORESET, for transmission to the UE; a memory interface configured to send from a memory the REG bundling size for the first CORESET and the REG bundling size for the second CORESET.

Example 9 includes the apparatus of example 8, wherein the one or more processors are further configured to encode the REG bundling size for the first CORESET for transmission to the UE, wherein the first CORESET includes control channel elements (CCE) that are mapped to one or more resource elements in the REGs using interleaving.

Example 10 includes the apparatus of example 8, wherein the one or more processors are further configured to encode the REG bundling size for the second CORESET for transmission to the UE, wherein the second CORESET includes control channel elements (CCE) that are mapped to one or more resource elements in the REG using interleaving.

Example 11 includes the apparatus of example 8, further comprising a transceiver, wherein the transceiver is configured to transmit the REG bundling size for the first CORESET and the REG bundling size for the second CORESET to the UE via higher layer signaling.

Example 12 includes the apparatus of example 10 or 11, wherein the higher layer signaling is radio resource control (RRC) signaling.

Example 13 includes the apparatus of example 8, wherein the first CORESET is one of a common CORESET, or a UE-specific CORESET.

Example 14 includes the apparatus of example 8, wherein the second CORESET is one of a common CORESET, or a UE-specific CORESET.

Example 15 includes the apparatus of example 8 to 14, wherein the serving cell includes application circuitry, baseband circuitry, Radio Frequency (RF) circuitry, front-end module (FEM) circuitry, one or more antennas, and power management circuitry (PMC).

Example 16 includes at least one machine readable storage medium having instructions embodied thereon for a user equipment (UE) to configure a control resource set (CORESET), the instructions thereon when executed by one or more processors at the UE perform the following: decode a signal, received from a next generation node B (gNB), that includes a resource element group (REG) bundling size for a first CORESET; decode a signal, received from the gNB that includes a REG bundling size for a second CORESET; and decode a control message contained in one or more REGs in one or more of the first CORESET or the second CORESET.

Example 17 includes the at least one machine readable storage medium in example 16 further comprising instructions, that when executed by one or more processors at the UE, perform the following: determine the REG bundling size for the first CORESET, wherein the first CORESET includes control channel elements (CCE) that are mapped to one or more resource elements in the REG using interleaving.

Example 18 includes the at least one machine readable storage medium in example 16 further comprising instructions, that when executed by one or more processors at the UE, perform the following: determine the REG bundling size for the second CORESET, wherein the second CORESET includes control channel elements (CCE) that are mapped to one or more resource elements in the REG using interleaving.

Example 19 includes the at least one machine readable storage medium in example 16, wherein the first CORESET is one of a common CORESET or a UE-specific CORESET.

Example 20 includes the at least one machine readable storage medium in example 16, wherein the second CORESET is one of a common CORESET or a UE-specific CORESET.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), operable with control resource sets (CORESETs) from a base station, the apparatus comprising:
    a memory interface configured to store a first resource element group (REG) bundling size for a first CORESET and a second REG bundling size for a second CORESET; and
    one or more processors configured to:
        decode a first signal, received from the base station, that includes the first REG bundling size for the first CORESET;

decode a second signal, received from the base station, that includes the second REG bundling size for the second CORESET; and perform one or more of decoding a first control message contained in one or more REGs of the first CORESET using the first REG bundling size from the first signal and decoding a second control message contained in one or more REGs of the second CORESET using the second REG bundling size of the second signal.

2. The apparatus of the UE of claim 1, further comprising a transceiver, wherein the transceiver is configured to receive the first REG bundling size for the first CORESET and the second REG bundling size for the second CORESET via higher layer signaling.

3. The apparatus of the UE of claim 2, wherein the higher layer signaling is radio resource control (RRC) signaling.

4. The apparatus of the UE of claim 1, wherein the first CORESET is one of a common CORESET and a UE-specific CORESET.

5. The apparatus of the UE of claim 4, wherein the second CORESET is one of a common CORESET and a UE-specific CORESET.

6. The apparatus of the UE of claim 1, wherein the UE includes an antenna, a touch sensitive display screen, a speaker, a microphone, a graphics processor, an application processor, an internal memory, a non-volatile memory port, or combinations thereof.

7. An apparatus of a serving cell, operable to configure a control resource set (CORESET) for a user equipment (UE), the apparatus comprising:

a memory interface configured to store a first resource element group (REG) bundling size for a first CORESET and a second REG bundling size for a second CORESET; and one or more processors configured to:
encode the first REG bundling size for the first CORESET, in a first signal, for transmission to the UE;
encode the second REG bundling size for the second CORESET, in a second signal, for transmission to the UE; and
perform one or more of encoding a first control message contained in one or more REGs of the first CORESET for transmission to the UE using the first REG bundling size and encoding a second control message contained in one or more REGs of the second CORESET for transmission to the UE using the second REG bundling size.

8. The apparatus of the serving cell of claim 7, wherein the first CORESET includes control channel elements (CCEs) that are mapped to one or more resource elements in the one or more REGs of the first CORESET using interleaving.

9. The apparatus of the serving cell of claim 8, wherein the second CORESET includes CCEs that are mapped to one or more resource elements in the one or more REGs of the second CORESET using interleaving.

10. The apparatus of the serving cell of claim 7, further comprising a transceiver, wherein the transceiver is configured to transmit the first REG bundling size for the first CORESET and the second REG bundling size for the second CORESET to the UE via higher layer signaling.

11. The apparatus of the serving cell of claim 10, wherein the higher layer signaling is radio resource control (RRC) signaling.

12. The apparatus of the serving cell of claim 7, wherein the first CORESET is one of a common CORESET and a UE-specific CORESET.

13. The apparatus of the serving cell of claim 12, wherein the second CORESET is one of a common CORESET and a UE-specific CORESET.

14. The apparatus of the serving cell of claim 7, wherein the serving cell includes application circuitry, baseband circuitry, Radio Frequency (RF) circuitry, front-end module (FEM) circuitry, one or more antennas, and power management circuitry (PMC).

15. A method of a user equipment (UE) operable with control resource sets (CORESETs) from a base station, comprising:

decoding a first signal, received from the base station, that includes a first resource element group (REG) bundling size for a first CORESET;

decoding a second signal, received from the base station, that includes a second REG bundling size for a second CORESET; and performing one or more of decoding a first control message contained in one or more REGs of the first CORESET using the first REG bundling size from the first signal and decoding a second control message contained in one or more REGs of the second CORESET using the second REG bundling size from the second signal.

16. The method of claim 15,
wherein the first CORESET includes control channel elements (CCEs) that are mapped to one or more resource elements in the one or more REGs of the first CORESET using interleaving.

17. The method of claim 15, further comprising
receiving the first REG bundling size for the first CORESET and the second REG bundling size for the second CORESET via higher layer signaling.

18. The method of claim 17,
wherein the higher layer signaling is radio resource control (RRC) signaling.

19. The method of claim 15, wherein the first CORESET is one of a common CORESET and a UE-specific CORESET.

20. The method of claim 19, wherein the second CORESET is one of a common CORESET and a UE-specific CORESET.

* * * * *